(12) United States Patent
Muthurajan et al.

(10) Patent No.: US 9,990,500 B2
(45) Date of Patent: Jun. 5, 2018

(54) DETERMINING APPLICATION VULNERABILITIES

(75) Inventors: Sasi Siddharth Muthurajan, Atlanta, GA (US); Prajakta Subhash Jagdale, Mountain View, CA (US); Leonid Promyshlyansky Bensman, Johns Creek, GA (US); Iftach Ragoler, Alpharetta, GA (US); Philip Edward Hamer, Alpharetta, GA (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 13 days.

(21) Appl. No.: 14/398,037

(22) PCT Filed: Jul. 25, 2012

(86) PCT No.: PCT/US2012/048119
§ 371 (c)(1),
(2), (4) Date: Oct. 30, 2014

(87) PCT Pub. No.: WO2014/018029
PCT Pub. Date: Jan. 30, 2014

(65) Prior Publication Data
US 2015/0128281 A1    May 7, 2015

(51) Int. Cl.
*G06F 21/57* (2013.01)
*G06F 21/62* (2013.01)
(Continued)

(52) U.S. Cl.
CPC ........ *G06F 21/577* (2013.01); *G06F 21/6227* (2013.01); *H04L 63/1433* (2013.01);
(Continued)

(58) Field of Classification Search
CPC ............ G06F 21/577; G06F 2221/033; G06F 11/3003
(Continued)

(56) References Cited

U.S. PATENT DOCUMENTS 7,765,597 B2    7/2010  Sima et al.
2005/0273854 A1*  12/2005  Chess ................. G06F 11/3612
726/22
(Continued)

FOREIGN PATENT DOCUMENTS

CN    101425035 A    5/2009
CN    102520985       6/2012
(Continued)

OTHER PUBLICATIONS

Kar, "SQLiGoT: Detecting SQL injection attacks using graph of tokens and SVM", 2016, Computers & Security, pp. 206-225.*
(Continued)

*Primary Examiner* — Thanhnga B. Truong
*Assistant Examiner* — Gregory Lane

(57) ABSTRACT

Disclosed herein are techniques for determining vulnerabilities in applications under testing. It is determined whether a first database instruction of an application enters information into a database and whether a second database instruction thereof obtains said information from the database. If the first database instruction enters the information in the database and the second database instruction obtains the information therefrom, it is determined whether the application is vulnerable to entry of malicious code via the database.

16 Claims, 5 Drawing Sheets

(51) Int. Cl.
*H04L 29/06* (2006.01)
*G06F 11/30* (2006.01)
*G06F 11/34* (2006.01)

(52) U.S. Cl.
CPC ...... *G06F 11/3003* (2013.01); *G06F 11/3093* (2013.01); *G06F 11/3476* (2013.01); *G06F 2201/865* (2013.01); *G06F 2221/033* (2013.01)

(58) Field of Classification Search
USPC .......................................................... 726/25
See application file for complete search history.

(56) References Cited

U.S. PATENT DOCUMENTS

| | | |
|---|---|---|
| 2007/0162427 A1 | 7/2007 | Yamaoka |
| 2008/0034424 A1 | 2/2008 | Overcash et al. |
| 2008/0133210 A1* | 6/2008 | Chagoly ............. G06F 11/3688 703/22 |
| 2008/0209567 A1* | 8/2008 | Lockhart ............ G06F 11/3612 726/25 |
| 2009/0125976 A1 | 5/2009 | Wassermann et al. |
| 2009/0205047 A1* | 8/2009 | Podjarny .............. G06F 21/577 726/25 |
| 2009/0265692 A1* | 10/2009 | Godefroid ........... G06F 11/3688 717/128 |
| 2010/0023810 A1* | 1/2010 | Stolfo ................. G06F 11/3652 714/38.11 |
| 2010/0153780 A1* | 6/2010 | Kirtkow .............. G06F 11/3684 714/37 |
| 2011/0252475 A1 | 10/2011 | Mui et al. |
| 2011/0258165 A1* | 10/2011 | Jung ..................... G06F 21/568 707/687 |
| 2012/0090026 A1 | 4/2012 | Andrews et al. |
| 2012/0117644 A1* | 5/2012 | Soeder ................ G06F 21/6227 726/22 |
| 2012/0198557 A1* | 8/2012 | Pistoia .................. G06F 21/563 726/25 |
| 2015/0248558 A1 | 9/2015 | Madou |
| 2015/0264074 A1 | 9/2015 | Mendelev |
| 2015/0379273 A1 | 12/2015 | Chess |

FOREIGN PATENT DOCUMENTS

| | | |
|---|---|---|
| JP | 2004-164617 A | 6/2004 |
| JP | 2009-116847 A | 5/2009 |
| JP | 2009-119647 A | 6/2009 |
| KR | 10-2009-0044656 A | 5/2009 |
| WO | WO-2011073983 A1 | 6/2011 |

OTHER PUBLICATIONS

Cross-site Scripting Prevention with Dynamic Data Tainting and Static Analysis, Vogt, P. et al., 2007, 12pp, http://publik.tuwien.ac.at/files/pub-inf_5310.pdf.
International Searching Authority, Appl No. PCT/US2012/048119, filed Jul. 25, 2012, International Search Report and Written Opinion, 9pp, dated Jan. 17, 2013.
Supplementary European Search Report, European Patent Application No. 12881603.0, dated Jan. 27, 2016, 8 pages.
Kosuga Yet al.;Sania: Syntactic and Semantic Analysis for Automated Testing against SQL Injection; Department of Information and Computer Science, Keio University; 2007 IEEE (10 pages).

* cited by examiner

DETERMINING APPLICATION VULNERABILITIES

BACKGROUND

Software security testing may be used to identify vulnerabilities in an application, such as a web-based application. Traditional black-box security testing may use a security testing application that poses as an attacker. The security testing application may also monitor the instructions executed by the application in response to the attack. Analysis of these triggered instructions may facilitate detection of vulnerabilities that permit unscrupulous users to insert malicious code therein.

DETAILED DESCRIPTION

As noted above, a security testing application may monitor instructions executed by an application being subjected to security testing in order to detect vulnerabilities therein. However, the application being tested may execute countless instructions in response to input by a security testing application. Analyzing and testing every triggered instruction may be burdensome and time consuming. The performance of the security test may be adversely affected due to the high number of instructions that need to be evaluated.

In view of the foregoing, disclosed herein are an improved system, non-transitory computer readable medium, and method to detect vulnerabilities in applications under testing ("AUT"). In one example, it may be determined whether a first database instruction of an application enters information into a database and whether a second database instruction thereof obtains said information from the database. If the first database instruction enters the information in the database and the second database instruction obtains the information therefrom, it may be determined whether the application is vulnerable to entry of malicious code via the database. In another example, malicious code may be defined as any software created to disrupt computer operations, gather sensitive information or gain access to private computer systems.

Since malicious code may be stored in and executed from a database, instructions that are not associated with database instructions may be ignored. Thus, even when testing large applications executing countless instructions, security testing may be carried out more efficiently. The aspects, features and advantages of the present disclosure will be appreciated when considered with reference to the following description of examples and accompanying figures. The following description does not limit the application; rather, the scope of the disclosure is defined by the appended claims and equivalents.

Figure 1:
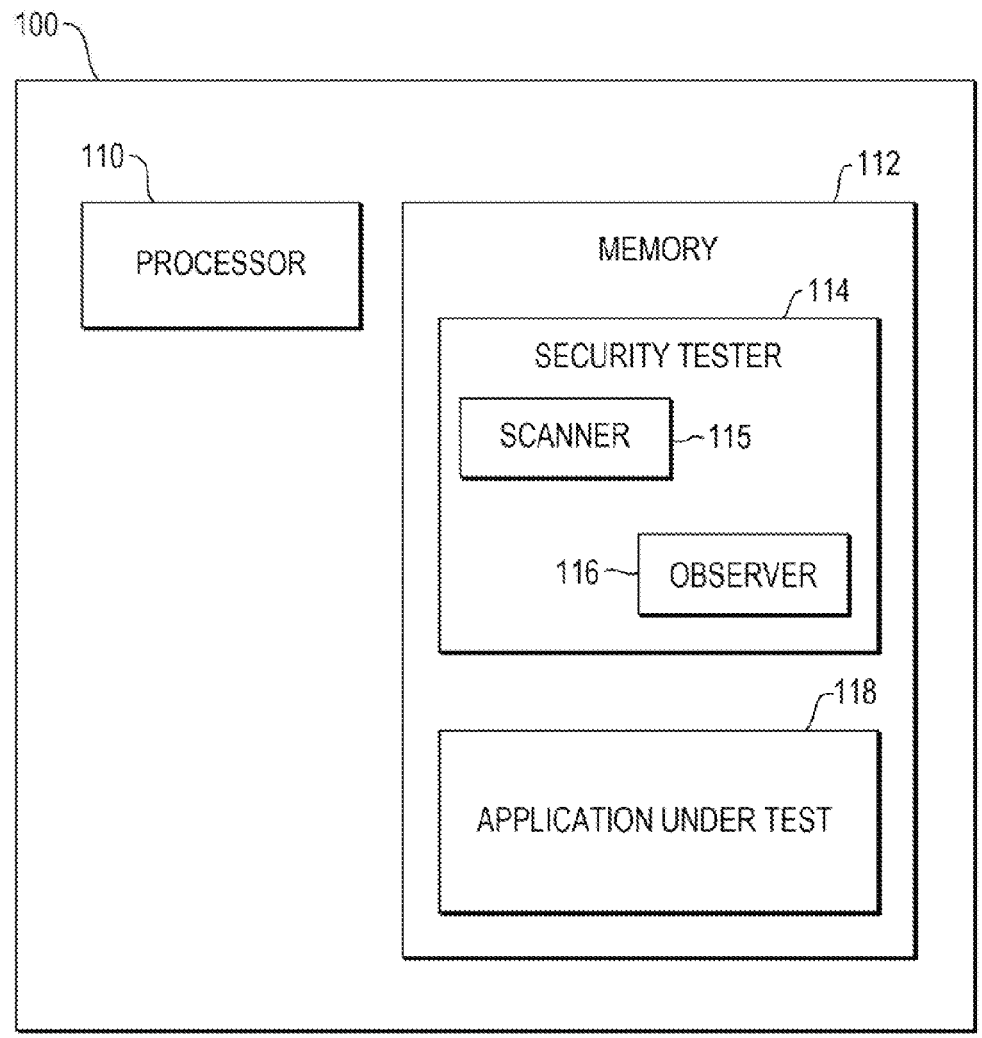
FIG. 1 is a block diagram of an example system that may be used to conduct security testing in accordance with aspects of the disclosure.

FIG. 1 presents a schematic diagram of an illustrative computer apparatus 100 depicting various components in accordance with aspects of the present disclosure. The computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface (not shown) to communicate with other devices over a network using conventional protocols (e.g., Ethernet, Bluetooth, etc.).

The computer apparatus 100 may also contain a processor 110 and a memory 112. Memory 112 may store instructions that may be retrieved from and executed by processor 110. In one example, memory 112 may be a random access memory ("RAM") device. In a further example, memory 112 may be divided into multiple memory segments organized as dual in-line memory modules ("DIMMs"). Alternatively, memory 112 may comprise other types of devices, such as memory provided on floppy disk drives, tapes, and hard disk drives, or other storage devices that may be coupled to computer apparatus 100 directly or indirectly. The memory may also include any combination of one or more of the foregoing and/or other devices as well. The processor 110 may be any number of well known processors, such as processors from Intel® Corporation. In another example, the processor may be a dedicated controller for executing operations, such as an application specific integrated circuit ("ASIC"). Furthermore, computer apparatus 100 may actually comprise multiple processors and memories working in tandem.

The instructions residing in memory 112 may comprise any set of instructions to be executed directly (such as machine code) or indirectly (such as scripts) by processor 110. In this regard, the terms "instructions," "scripts," "applications," and "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

Security tester module 114 may implement the techniques disclosed herein and may be realized in any non-transitory computer-readable media. Thus, in one example, memory 112 may be a non-transitory computer-readable media for use by or in connection with an instruction execution system such as computer apparatus 100, an ASIC or other system that can fetch or obtain the logic from non-transitory computer-readable media and execute the instructions contained therein. "Non-transitory computer-readable media" may be any media that can contain, store, or maintain programs and data for use by or in connection with the instruction execution system. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, or a portable compact disc.

Security tester module 114 may include a scanner module 115 that interacts with AUT 118 and evaluates instructions executed therein. If AUT 118 is a web based application, for example, scanner module 115 may simulate an attack using Hypertext Transfer Protocol ("HTTP") requests in an attempt to expose vulnerabilities in AUT 118. While AUT 118 processes the HTTP request, the observer module 116 may monitor the behavior thereof. For example, while monitoring AUT 118, the observer module 116 may identify and record executed lines of code, accessed files, performed database queries, and the like. Scanner module 115 may also request observer module 116 to provide these observations in order to evaluate the behavior of AUT 118 triggered by the request (e.g., HTTP request) sent by scanner module 115. Scanner module 115 may detect vulnerabilities in AUT 118 based on the information received from observer module 116. Vulnerability reports may be displayed to a test engineer via a user interface provided by security tester module 114. In one example, a vulnerability may be a persistent vulnerability. An application containing a persistent vulnerability may permit entry of malicious code, persistence of the malicious code therein, and activation of the malicious code at a later time. One instance of such a vulnerability is persistent cross-site-scripting.

It is understood that the techniques disclosed herein may be utilized to detect vulnerabilities in any client/server application. Thus, scanner module 115 may interact with and observer module 116 may monitor AUT 118 accordingly. In one example, AUT 118 may be a web-based application encoded in any suitable Web-based computer language, such as JAVA or .NET. AUT 118 may operate within a suitable framework, such as Struts, Struts 2, ASP.NET MVC, Oracle WebLogic, and Spring MVC. The software framework may include a set of common modules that provide generic functionality. Such common modules may be selectively overridden or customized. AUT 118 may execute one or more instances of a Java Virtual Machine ("JVM"), Common Language Runtime ("CLR"), or other runtime environment for processing requests from scanner module 115.

Figure 2:
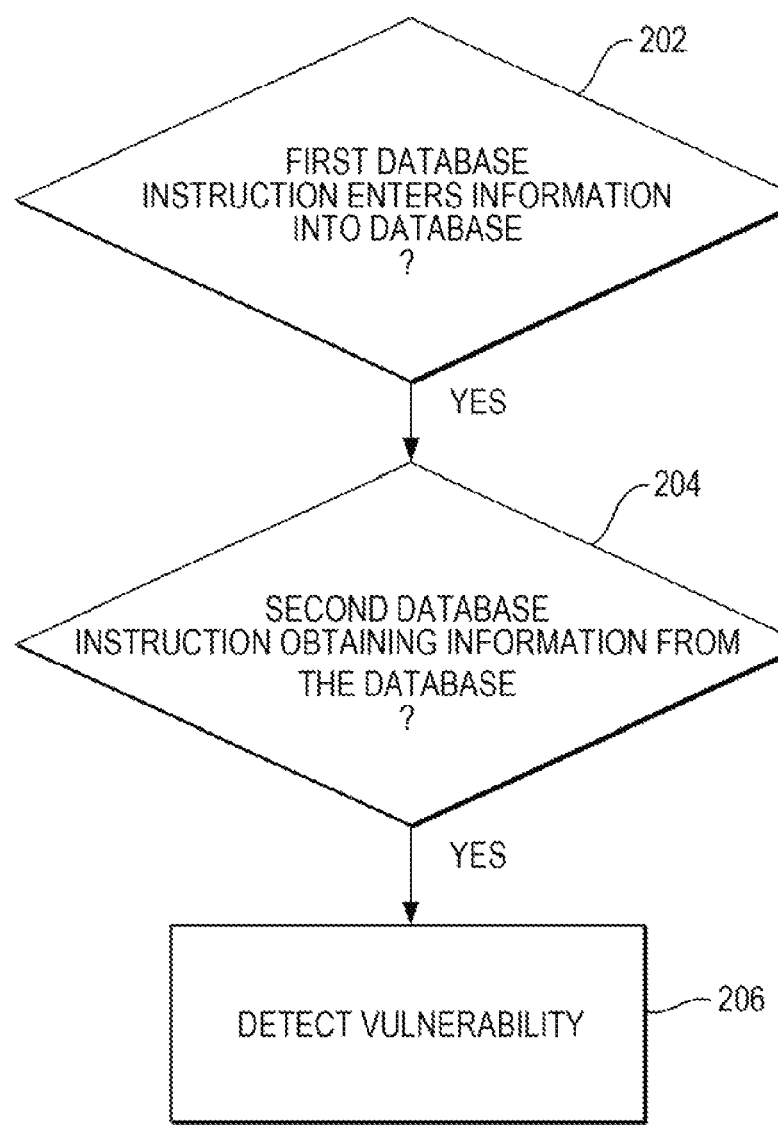
FIG. 2 is a flow diagram of an example method for security testing in accordance with aspects of the present disclosure.
Figure 3:
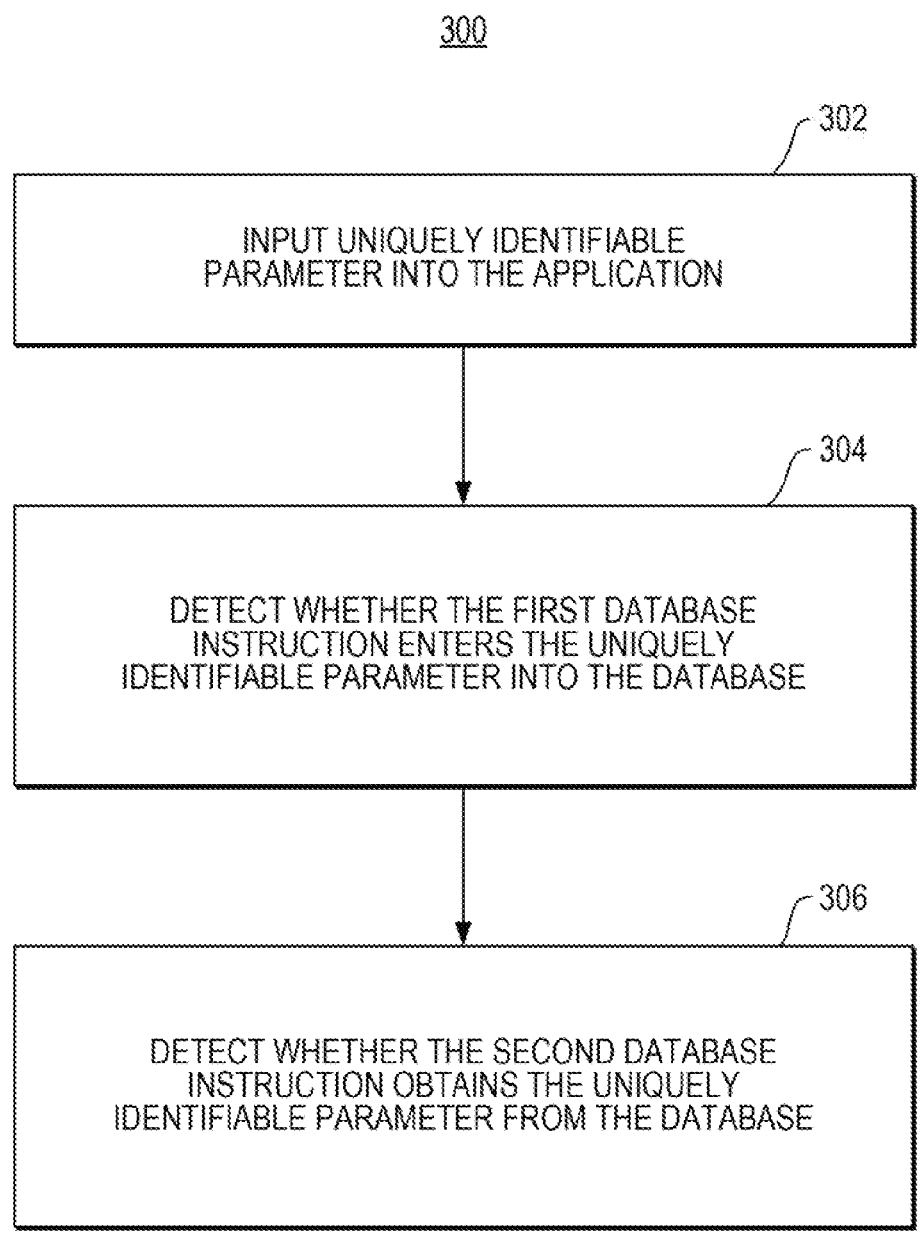
FIG. 3 is a flow diagram of a further example method for security testing in accordance with aspects of the present disclosure.
Figure 4:
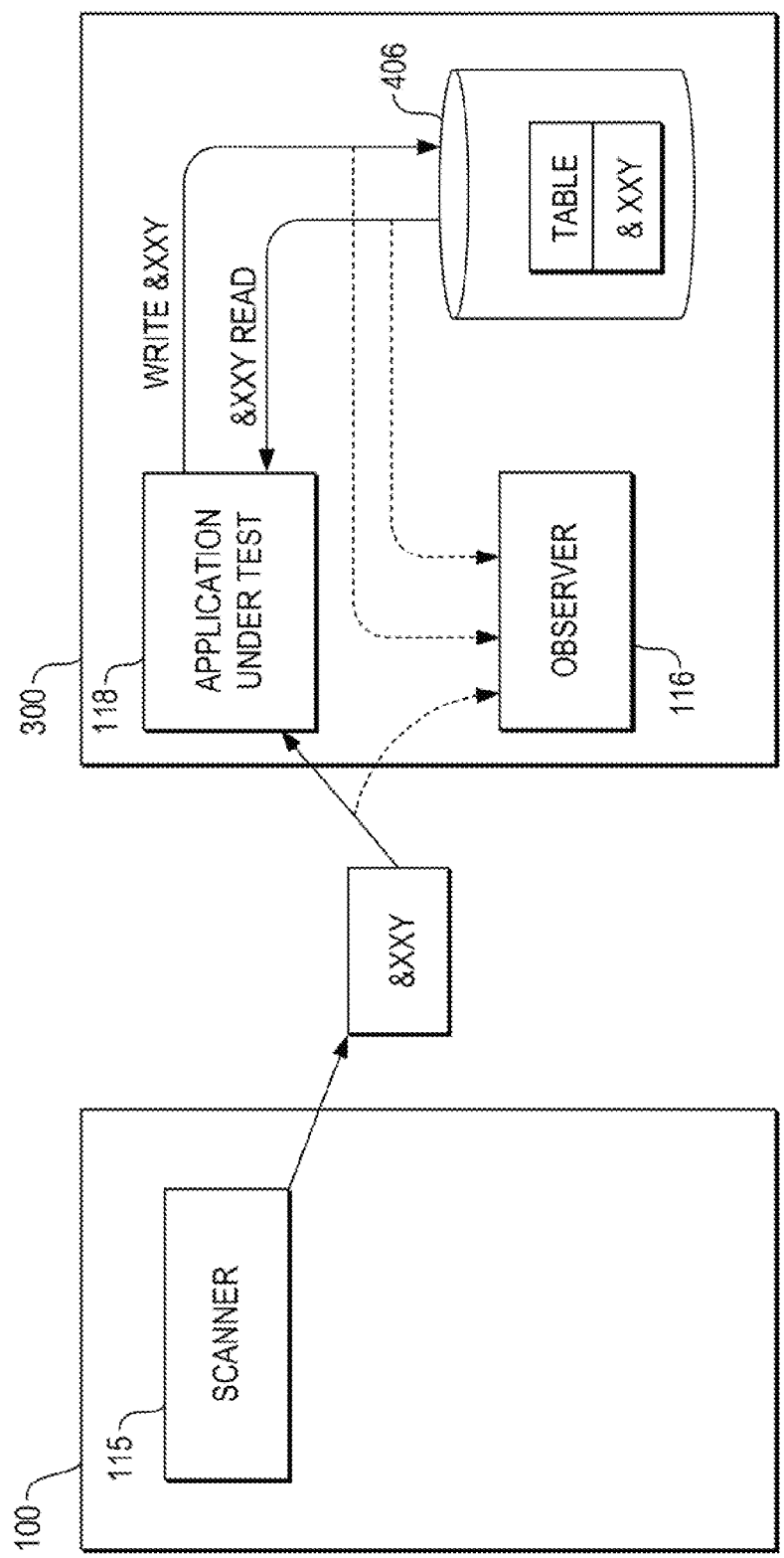
FIG. 4 is a working example of a testing system for detecting application vulnerabilities in accordance with aspects of the present disclosure.
Figure 5:
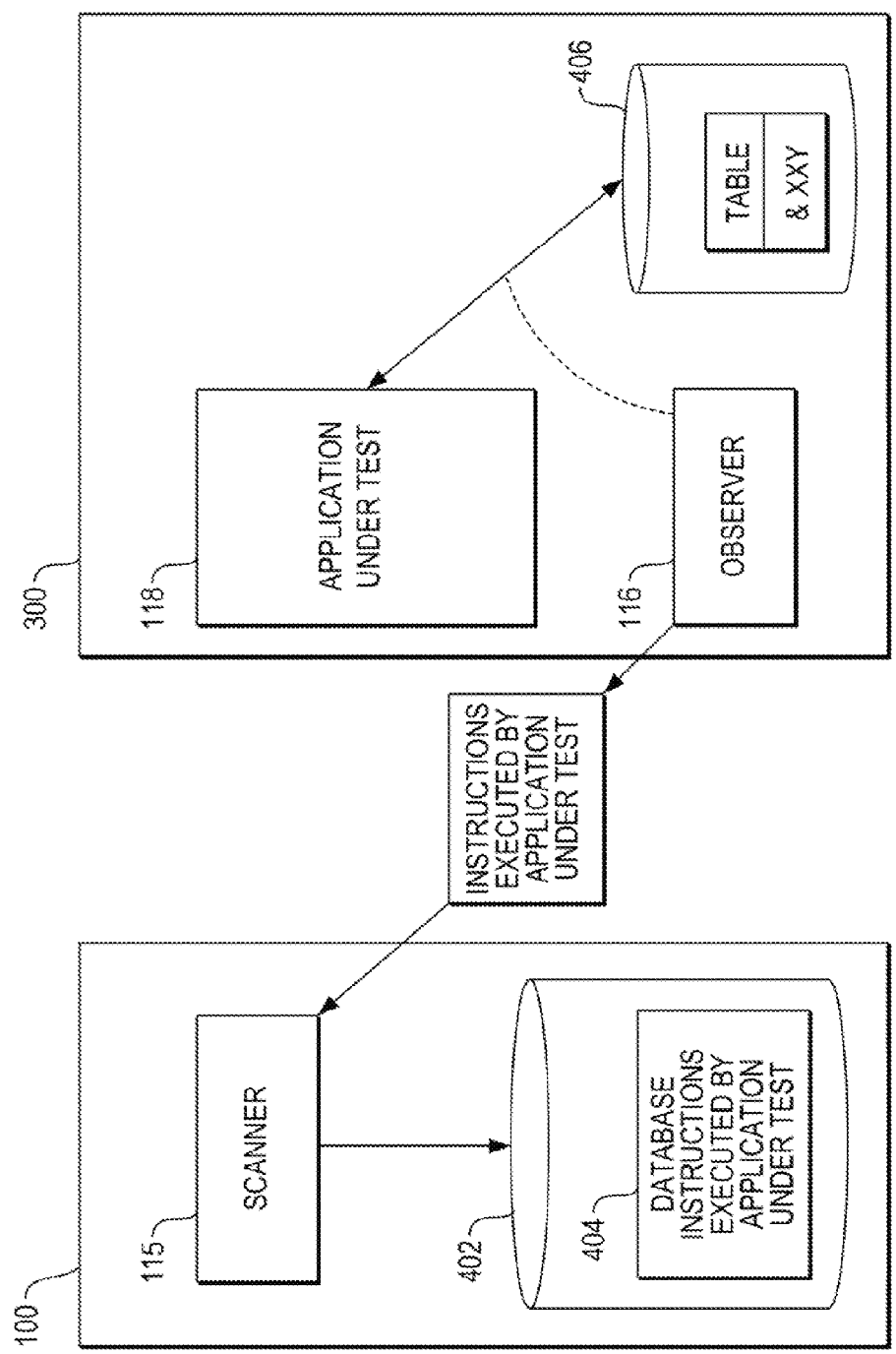
FIG. 5 is a further working example of a testing system for detecting vulnerabilities in accordance with aspects of the present disclosure.

Although the components illustrated in FIG. 1 are shown within the same block, it will be understood that computer apparatus 100 may actually comprise additional processors and memories that may or may not be stored within the same physical housing or location. Furthermore, as will be shown further below, some or all of the instructions may be stored in a location physically remote from, yet still accessible by, the processors. For example, scanner module 115, observer module 116, and AUT 118 may execute on different computers communicating over a network. In this instance, the network and any intervening nodes thereof may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Computer apparatus 100 may also comprise a plurality of computers, such as a load balancing network, that exchange information with different nodes of a network for the purpose of receiving, processing, and transmitting data to multiple remote computers. In this instance, computer apparatus 100 may typically still be at different nodes of the network One working example of the system method, and non-transitory computer-readable medium is shown in FIGS. 2-5. In particular, FIGS. 2-3 illustrate flow diagrams of example methods for detecting vulnerabilities in an application in accordance with the present disclosure. FIGS. 4-5 show a working example of vulnerability detection in accordance with the techniques disclosed herein. The actions shown in FIGS. 4-5 will be discussed below with regard to the flow diagrams of FIGS. 2-3.

Referring to FIG. 2, it may be determined whether a first database instruction enters information into a database, as shown in block 202. In block 204, it may be further determined whether a second database instruction obtains the information from the database. As noted above, observer module 116 may provide scanner module 115 with a list of instructions executed by AUT 118 that were triggered by input from scanner module 115. Since malicious code is typically stored in and executed from a database, scanner module 115 may ignore non-database instructions and search for any instructions that enter or obtain information into and from a database.

The observer module 116 may have access to the internal operations of AUT 118. For example, observer module 116 may inject additional code into AUT 118, such as a JAVA class, at strategic points therein. One example of a strategic point is an application programming interface ("API") call that performs specific operations, such as reading a URL parameter or writing to a file system. Whenever such a program point is executed, the injected code may invoke services provided by observer module 116 to record these operations. In another example, observer module 116 may store the collected information into a buffer. The buffer may be used to store collected information that has yet to be transmitted to scanner module 115. The buffer may be stored in a non-volatile storage medium such as a hard disk, solid state drive, or the like.

Database instructions may include any instruction that causes a processor to insert or obtain data from some data repository. A database as used herein is not limited to any particular data structure or product. The data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data. As such, a database instruction may be constructed in accordance with the type of database used by AUT 118. For example, if AUT 118 uses a relational database, scanner module 115 may detect standard query language ("SQL") instructions. If the database is a flat file, the database instructions may be write or read commands into or from the flat file.

Referring back to FIG. 2, a vulnerability may be detected, as shown in block 206. As noted above, the detected vulnerability may be based on the information collected by observer module 116, which may include the database instructions executed by AUT 118 in response to an interaction with scanner module 115. As also noted above, ignoring non-database instructions may enable security tester module 114 to detect vulnerabilities more efficiently.

Referring now to FIG. 3, a flow diagram of another example method of vulnerability detection is shown. In block 302, a uniquely identifiable parameter may be entered into the application, such as AUT 118, Referring now to the example of FIG. 4, two networked computers are shown in which scanner module 115 executes in computer apparatus 100 while AUT 118 and observer module 116 executes in computer apparatus 300. Although only two computers are depicted in FIG. 4, it should be appreciated that more networked computers may be utilized. Here, scanner module 115 is shown entering a uniquely identifiable parameter "&XXY" into AUT 118. This parameter may be entered via a prompt generated by AUT 118, such as a prompt for login information. Attackers may use these prompts to enter malicious code in response thereto instead of entering the requested information. It should be appreciated that the parameter "&XXY" shown in FIG. 4 is merely illustrative and that any arbitrary unique parameter may be used. Receipt of the unique parameter may trigger the execution of instructions in AUT 118 that may be monitored and recorded by observer module 116. This uniquely identifiable parameter may be traced throughout AUT 118 by scanner module 115.

Referring back to FIG. 3, it may be detected whether a first database instruction enters the uniquely identifiable parameter into the database, as shown in block 304. In block 306, it may be detected whether the second database instruction obtains the uniquely identifiable parameter from the database. Referring back to FIG. 4, the entry of parameter "&XXY" may trigger a read and a subsequent write of the parameter into and from database 406, The database instructions that write and read parameter "&XXY" to and from database 406 may be recorded by observer module 116.

Referring now to FIG. 5, scanner module 115 may receive a list of instructions executed by AUT 118 that were triggered by the entry of parameter "&XXY." The instructions may include instructions associated with displaying a dialog box, reading from the network, or the like. However, scanner module 115 may filter out these other types of commands and search for database instructions handling the "&XXY" parameter. For example, the instructions that store and read the "&XXY" parameter into and from database 406 may be searched by scanner module 115. These write and read instructions may be associated with each other and stored in table 404 of database 402.

Once the database instructions that handled the "&XXY" parameter are detected, scanner module 115 may target these instructions in a simulated attack using simulated malicious code. Targeting the database instructions that handled the "&XXY" parameter rather than targeting all the instructions executed in response to the parameter may save a considerable amount of time. If the database instructions that handled the "&XXY" parameter insert and retrieve the simulated malicious code into and from the database without restriction, scanner module 115 may deem these instructions as a vulnerability. As noted above, retrieval of malicious code from a database may cause execution thereof. A user may be alerted of this exposure via a user interface. In one example, the alert may also include the computer code in AUT 118 that causes the vulnerability. Awareness of the vulnerabilities and their location enables a software engineer to add validation code to AUT 118 that prevents insertion or retrieval of the malicious code.

Advantageously, the foregoing system, method, and non-transitory computer readable medium allows security test applications to execute more efficiently by ignoring information irrelevant to security vulnerabilities. In this regard, security testing of large applications may be less cumbersome for testing engineers. In turn, properly tested versions of software may be promptly released into the market.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein; rather, processes may be performed in a different order or concurrently and steps may be added or omitted.

The invention claimed is:

1. A system, comprising:
   a physical processor; and
   a non-transitory storage medium storing machine readable instructions executable on the physical processor to:
   determine whether a set of instructions executed by an application under testing includes a set of database instructions;
   responsive to determining that the set of instructions includes the set of database instructions:
   determine whether a first database instruction of the set of database instructions causes information to be entered into a database;
   determine whether a second database instruction of the set of database instructions causes the information to be obtained from the database;
   responsive to determining that the first database instruction causes the information to be entered in the database and the second database instruction causes the information from the database to be obtained from the database, target, by a scanner, the first and second database instructions of the application in a simulated attack using simulated malicious code, and determine, based on the simulated attack, vulnerable computer code in the application that causes entry of malicious code into the database via execution of the first database instruction and executes the malicious code via execution of the second database instruction; and
   filter out other instructions of the application from vulnerability detection by the scanner, by declining to perform a simulated attack using simulated malicious code on the other instructions of the application, in response to determining that the other instructions do not enter information into and obtain information from the database.

2. The system of claim 1, wherein the machine readable instructions are executable on the physical processor to determine whether the first database instruction causes information to be entered into the database and whether the second database instruction causes the information to be obtained from the database by:
   inputting a uniquely identifiable parameter into the application;
   detecting whether the first database instruction causes the uniquely identifiable parameter to be entered into the database; and
   detecting whether the second database instruction causes the uniquely identifiable parameter to be obtained from the database.

3. The system of claim 1, wherein the machine readable instructions are executable on the physical processor to:
   associate the first database instruction with the second database instruction responsive to determining that the application is vulnerable to entry of malicious code into the database via execution of the first database instruction and is vulnerable to execution of the malicious code via the second database instruction.

4. The system of claim 1, wherein the application under testing comprises a web-based application.

5. A non-transitory machine-readable storage medium storing instructions that, when executed, cause at least one physical processor to:
monitor instructions executed by an application under testing;
detect database instructions in the instructions executed by the application under testing;
determine whether a first database instruction of the detected database instructions causes information to be entered into a database, and determine whether a second database instruction of the detected database instructions causes the information to be obtained from the database;
responsive to determining that the first database instruction causes the information to be entered in the database and the second database instruction causes the information to be obtained from the database, target, by a scanner, the first and second database instructions of the application in a simulated attack using simulated malicious code, and detect, based on the simulated attack, vulnerable computer code in the application that causes entry of malicious code into the database via execution of the first database instruction and executes the malicious code via execution of the second database instruction; and
filter out other instructions of the application from vulnerability detection by the scanner, by declining to perform a simulated attack using simulated malicious code on the other instructions of the application, in response to determining that the other instructions do not enter information into and obtain information from the database.

6. The non-transitory machine-readable medium of claim 5, wherein to determine whether the first database instruction causes information to be entered into the database and whether the second database instruction causes the information to be obtained from the database, the instructions, when executed, further cause the at least one physical processor to:
input a uniquely identifiable parameter into the application;
detect whether the first database instruction causes the uniquely identifiable parameter to be entered into the database; and
detect whether the second database instruction causes the uniquely identifiable parameter to be obtained from the database.

7. The non-transitory machine-readable medium of claim 5, wherein the instructions, when executed further cause the at least one physical processor to:
associate the first database instruction with the second database instruction responsive to determining that the application is vulnerable to entry of malicious code into the database via execution of the first database instruction and is vulnerable to execution of the malicious code via execution of the second database instruction.

8. The non-transitory machine-readable medium of claim 5, wherein the application under test comprises a web based application.

9. A method comprising:
entering, using a physical processor implementing machine readable instructions, a uniquely identifiable parameter into an application under testing;
determining, using the physical processor, whether instructions executed by the application in response to receiving the uniquely identifiable parameter include database instructions;
responsive to determining that the instructions include database instructions:
determining, using the physical processor, whether a first database instruction causes the uniquely identifiable parameter to be entered into a database;
determining, using the physical processor, whether a second database instruction causes the uniquely identifiable parameter to be obtained from the database; and
responsive to determining that the first database instruction causes the uniquely identifiable parameter to be entered into the database and the second database instruction causes the uniquely identifiable parameter to be obtained from the database, targeting, by a scanner, the first and second database instructions of the application in a simulated attack using simulated malicious code, and identifying, using the physical processor based on the simulated attack, vulnerable computer code of the application that enters malicious code into the database via execution of the first database instruction and executes the malicious code via the second database instruction; and
filtering out other instructions of the application from vulnerability detection by the scanner, by declining to perform a simulated attack using simulated malicious code on the other instructions of the application, in response to determining that the other instructions do not enter information into and obtain information from the database.

10. The method of claim 9, further comprising facilitating, using the physical processor, display of the vulnerable computer code that causes the application to be vulnerable to entry of malicious code.

11. The method of claim 9, further comprising associating, using the physical processor, the first database instruction with the second database instruction responsive to determining that the application is vulnerable to entry of malicious code into the database via execution of the first database instruction or is vulnerable to execution of the malicious code via the second database instruction.

12. The method of claim 9, wherein the application under test comprises a web-based application and the uniquely identifiable parameter is entered using Hyper Text transfer protocol.

13. The system of claim 2, wherein the machine readable instructions are executable on the physical processor to:
trigger recording of a subset of instructions of the application under testing that are executed responsive to input of the uniquely identifiable parameter.

14. The system of claim 13, wherein the machine readable instructions are executable on the physical processor to:
simulate an attack on the subset of recorded instructions of the application under testing, wherein the subset of recorded instructions comprises the first database instruction and the second database instruction.

15. The non-transitory machine-readable medium of claim 6, wherein the instructions, when executed further cause the at least one physical processor to:
trigger recording of a subset of instructions of the application under testing that are executed responsive to input of the uniquely identifiable parameter; and
simulate an attack on the subset of recorded instructions of the application under testing, wherein the subset of recorded instructions comprises the first database instruction and the second database instruction.

16. The method of claim 9, further comprising:

triggering, using the physical processor, recording of a subset of instructions of the application under testing that were executed responsive to input of the uniquely identifiable parameter; and simulating, using the physical processor, an attack on the subset of recorded instructions of the application under testing, wherein the subset of recorded instructions comprises the first database instruction and the second database instruction.

\* \* \* \* \*